United States Patent
Junqueira et al.

(10) Patent No.: US 11,755,253 B2
(45) Date of Patent: Sep. 12, 2023

(54) AUTOMATICALLY SCALING STREAMS IN DISTRIBUTED STREAM STORAGE

(71) Applicant: Dell Products L.P., Hopkinton, MA (US)

(72) Inventors: Flavio Junqueira, Barcelona (ES); Tom Kaitchuck, Portland, OR (US); Shivesh Ranjan, Navi mumbai (IN)

(73) Assignee: Dell Products L.P., Hopkinton, MA (US)

( * ) Notice: Subject to any disclaimer, the term of this patent is extended or adjusted under 35 U.S.C. 154(b) by 49 days.

(21) Appl. No.: 17/514,424

(22) Filed: Oct. 29, 2021

(65) Prior Publication Data
US 2023/0134861 A1 May 4, 2023

(51) Int. Cl.
*G06F 3/06* (2006.01)
*H04L 47/12* (2022.01)

(52) U.S. Cl.
CPC .............. *G06F 3/067* (2013.01); *H04L 47/12* (2013.01)

(58) Field of Classification Search
CPC ..... H04L 65/80; H04L 65/764; H04L 65/612; H04L 65/70; H04L 65/60; H04L 65/752; H04L 65/1101; H04L 9/40; H04L 65/756; H04L 65/762; H04L 67/1097; H04L 65/61; H04L 67/568; H04L 1/004; H04L 12/5602; H04L 45/7453; H04L 65/75; H04L 69/329; H04L 9/0643; H04L 12/18; H04L 65/611; H04L 65/65; H04L 67/01; H04L 67/55; H04L 67/566; H04L 67/62; H04L 65/403; H04L 45/74; H04L 43/026; H04L 12/2805; H04L 12/2809; H04L 12/2834; H04L 12/2838; H04L 12/40058; H04L 67/10; H04L 67/02; H04L 67/306; H04L 67/12; H04L 1/0041; H04L 1/0002; H04L 67/535; H04L 1/18; H04L 5/0064; H04L 67/51; H04L 65/765; H04L 63/0428; H04L 63/08; H04L 63/20; H04L 67/52; H04L 63/102; H04L 1/0009; H04L 63/10; H04L 1/1874; H04L 67/06; H04L 67/1095; H04L 67/104; H04L 2209/56; H04L 43/04; H04L 65/613; H04L 43/08; H04L 41/22; H04L 63/0227; H04L 63/1416; H04L 69/22; H04L 9/50; H04L 43/045; H04L 67/60;
(Continued)

(56) References Cited

U.S. PATENT DOCUMENTS 10,860,457 B1 * 12/2020 Evenson ............. G06F 11/3495
11,038,960 B1 * 6/2021 Ruiz ....................... H04L 67/60
(Continued)

*Primary Examiner* — Djenane M Bayard
(74) *Attorney, Agent, or Firm* — ANDERSON GORECKI LLP

(57) ABSTRACT

Event loading is individually tracked for each of the segments of a stream. Event loading trends of each of the segments of the stream based on event loading changes are identified and reported. Selected segments are automatically scaled-up or scaled-down based on the event loading trends. Individual segment event loading is measured by computing an exponential weighted moving average of data, measured either in events or bytes, received per fixed interval of time. Exponential functions are used to assign exponentially decreasing weights over time. Multiple different running averages are computed for different time intervals, each with a different weight that represents a decay factor.

20 Claims, 5 Drawing Sheets

(58) Field of Classification Search
CPC ... H04L 63/1425; H04L 43/16; H04L 51/214; H04L 69/08; H04L 41/0893; H04L 51/52; H04L 69/16; H04L 41/0894; H04L 9/3239; H04L 67/14; H04L 12/14; H04L 65/1069; H04L 12/66; H04L 63/105; H04L 41/5009; H04L 63/123; H04L 47/2475; H04L 47/12; H04L 41/12; H04L 41/5067; H04L 43/12; H04L 45/38; H04L 47/10; H04L 47/19; H04L 47/193; H04L 47/2441; H04L 47/2483; H04L 47/41; H04L 47/76; H04L 47/823; H04L 47/83; H04L 67/1001; H04L 67/101; H04L 67/1068; H04L 67/108; H04L 67/1091; H04L 67/146; H04L 69/14; H04L 45/75; G06F 16/2358; G06F 16/2379; G06F 9/542; G06F 3/0604; G06F 3/067; G06F 3/0659; G06F 3/061; G06F 3/0655; G06F 3/0679; G06F 2209/508; G06F 3/0617; G06F 3/0673; G06F 2201/86; G06F 3/0608; G06F 3/0629; G06F 3/0653; G06F 9/4401; G06F 9/452; G06F 11/1407; G06F 11/1453; G06F 11/1458; G06F 11/1471; G06F 11/3024; G06F 11/3034; G06F 11/3409; G06F 11/3476; G06F 15/16; G06F 15/173; G06F 16/24568; G06F 16/27; G06F 21/6218; G06F 21/629; G06F 3/0611; G06F 3/0622; G06F 3/0635; G06F 3/0638; G06F 3/0641; G06F 3/0643; G06F 3/065; G06F 3/0676; G06F 3/0677; G06F 3/0682; G06F 7/14; G06F 7/32; G06F 9/3555; G06F 9/3857; G06F 9/5005; G06F 9/5072; G06F 9/52; G06F 11/3072; G06F 11/3466; G06F 16/2255; G06F 16/25; G06F 2201/83; G06F 3/0613; G06F 3/0652

See application file for complete search history.

(56) References Cited

U.S. PATENT DOCUMENTS

2008/0140471 A1\* 6/2008 Ramsey .............. G06F 16/2462
702/179
2011/0276840 A1\* 11/2011 Fresson .............. G06F 11/0778
714/47.2
2018/0332367 A1\* 11/2018 Kaitchuck .......... H04N 21/4331

\* cited by examiner

AUTOMATICALLY SCALING STREAMS IN DISTRIBUTED STREAM STORAGE

TECHNICAL FIELD

The subject matter of this disclosure is generally related to electronic data storage systems, and more particularly to distributed stream storage.

BACKGROUND

A "stream" is an append-only data structure for storage of unbounded, continuously generated data that may be received from multiple sources in parallel. Examples of sources of unbounded, continuously generated data include networked sensors and video surveillance cameras. Pravega is an open-source storage system that organizes such data into streams. A Pravega stream is similar to a "topic" in RabbitMQ or Apache Kafka. Each stream includes one or more partitions known as "shards" or "segments." In Pravega, a segment is an append-only sequence of bytes. Events are appended to segments by serializing them into bytes. An event is a contiguous set of related extents of the unbounded, continuously generated data. For example, an event may be a timestamped readout from one sensor of a sensor array. Routing keys that are associated with events are used to select the segment that will contain the event. The event routing keys are hashed to form a "key space" that is divided into a number of partitions corresponding to the number of segments.

SUMMARY

In accordance with some aspects of the disclosed inventive concepts, a method is implemented in a storage system with at least one non-volatile drive and at least one compute node configured to access the drive to store unbounded, continuously generated data in a stream, the method comprising: routing incoming events to segments of the stream; measuring event loading of each of the segments of the stream; identifying event loading trends of each of the segments of the stream based on event loading changes; and scaling selected segments of the of the stream based on the event loading trends.

In accordance with some aspects of the disclosed inventive concepts, a non-transitory computer-readable storage medium stores instructions that when executed by a storage system causes the storage system to perform a method for storing unbounded, continuously generated data in a stream, the method comprising: routing incoming events to segments of the stream; measuring event loading of each of the segments of the stream; identifying event loading trends of each of the segments of the stream based on event loading changes; and scaling selected segments of the of the stream based on the event loading trends.

In accordance with some aspects of the disclosed inventive concepts, an apparatus comprises: at least one non-volatile drive on which a stream is stored; and at least one compute node comprising a controller and instances of a segment store, wherein the segment store instances are configured to route incoming events to segments of the stream, measure event loading of each of the segments of the stream and identify and report loading trends of each of the segments of the stream based on event loading changes, and the controller is configured to scale selected segments of the of the stream based on the event loading trends.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile electronic storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic," if used herein, refers to special purpose physical circuit elements, firmware, software, computer instructions that are stored on a non-transitory computer-readable medium and implemented by multi-purpose tangible processors, alone or in any combination. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure. Further, all examples, aspects and features mentioned in this document can be combined in any technically possible way.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
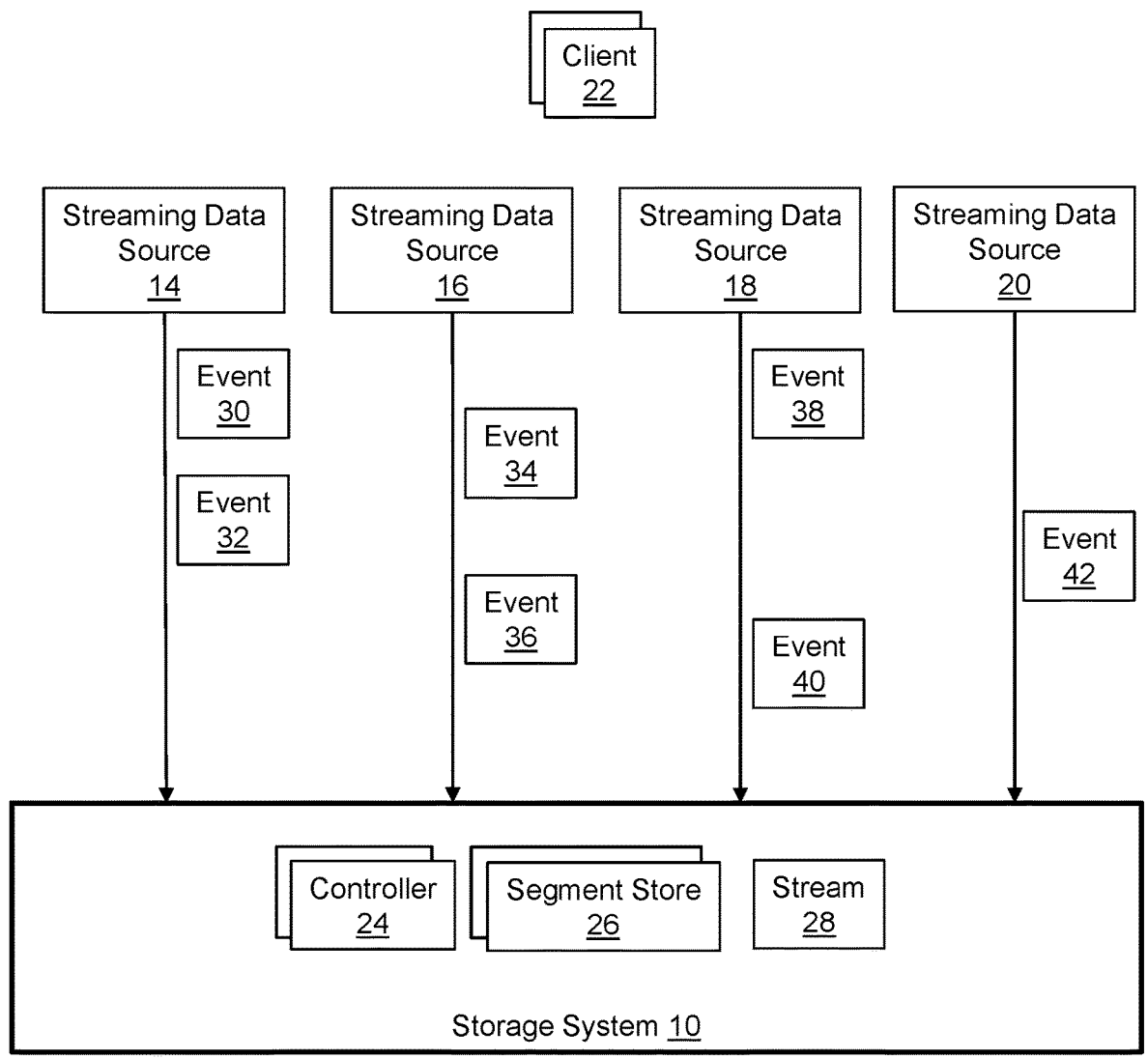
FIG. 1 illustrates a storage system configured to organize unbounded, continuously generated data into a stream that is auto-scaled based on individual segment loading.

FIG. 1 illustrates a storage system 10 that is configured to organize unbounded, continuously generated data into a stream 28 that is auto-scaled based on individual segment loading. Streaming data sources 14, 16, 18, 20 (writers) continuously generate unbounded data that is sent to the storage system 10, possibly in parallel. The data includes multiple events 30, 32, 34, 36, 38, 40, 42, each of which is associated with a routing key. The storage system 10 includes a controller 24, and segment store 26. A client 22 is a library that an application uses to read and write data from and to the storage system. There may be multiple instances of the client, controller, and segment store running contemporaneously, e.g., distributed across multiple servers, virtual machines, or containers. The client 22 is a library that is used by applications running on stream readers and writers as a dependency to enable events to be written to and read from the stream 28. All primitives enable access from concurrent client instances so there can be multiple event writers appending events to the stream while multiple event readers are reading from the stream. The controller 24 manages the lifecycle of the stream and transactions. The lifecycle of the stream includes features such as creation, scaling, truncation, and deletion. The controller manages a retention policy for the stream that specifies how the lifecycle features are implemented, e.g., requiring periodic truncation. There can be multiple controller instances for scalability and fault tolerance. The controller 24 also manages transactions, such as by creating transactions and either committing or aborting those transactions. Creating a transaction includes creating transaction segments. Committing a transaction includes merging transaction segments. Aborting includes dropping a transaction segment. The segment store 26 manages the lifecycle of segments. The segment store creates, merges, truncates, and deletes segments, and serves read and write request from clients. To store data and metadata, the segment store uses both durable logs and long-term storage. The segment store appends new data to the durable log synchronously before responding to clients, and writes asynchronously to long-term storage, which is the primary destination of data. The segment store uses a cache to serve tail stream reads, to read ahead from long-term storage, and to avoid reading from the durable log when writing to long-term storage.

Figure 2:
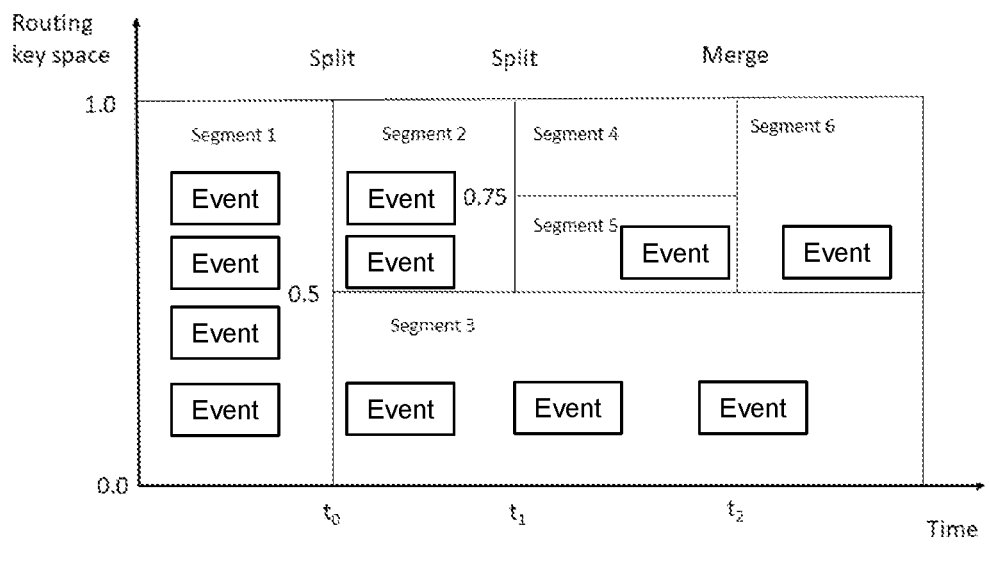
FIG. 2 illustrates stream scaling.

FIG. 2 illustrates auto-scaling of the stream 28. The stream initially has a single segment (segment 1). Segment 1 encompasses the entire key space of [0.0, 1.0). At time t0, segment 1 is scaled-up into two segments (segment 2 and segment 3). The routing key space of segment 1 is split equally such that segment 2 encompasses [0.5, 1.0) and segment 3 encompasses [0.0, 0.5). At time t1, segment 2 is scaled-up into segment 4 and segment 5 with an even split of routing key space. At time t2, segment 4 and segment 5 are scaled-down into a single segment (segment 6), which encompasses routing key space [0.0, 0.5). Calculation of scaling decisions will be described below.

Referring to FIGS. 1 and 2, incoming events are assigned to segments using a consistent hashing scheme such that each event is mapped to only one of the segments based on the user-provided routing key. Each segment is associated with only one instance of the segment store 26. Segment store instances monitor the rate of event traffic in each segment individually to identify trends. Based on these trends, the segment store instance associates a trend label with the segment. The trend label can have one of three values, e.g., "normal," "hot" or "cold." A segment identified as "hot" is characterized by a traffic trend that is greater than a predetermined target rate of traffic. The target rate is supplied by a user via a stream policy that will be described below. A segment identified as "cold" is characterized by a traffic trend that is less than the target traffic rate. A hot segment is a candidate for scale-up into two or more new segments, e.g., segment 2 being split into segment 4 and segment 5. A cold segment is a candidate for scale-down via merger with one or more other cold segments, e.g., segment 4 and segment 5 being merged into segment 6. A normal segment is a candidate for remaining as a single segment.

The controller 24 sends hints to the segment store 26 instances to communicate a scaling policy that describes the conditions for scaling, including a scaling type, target rate, and scale factor, as follows:
1. Scaling Type
   one of:
   a. Fixed: Don't scale.
   b. ByEventRate: Compute rate of traffic as events per second
   c. ByBytesRate: Compute rate of traffic as bytes per second
2. Target Rate: an 8-byte number that represents the desired target rate (in events per second or bytes per second).
3. Scale Factor: Maximum number of splits of a segment for a scale-up event.

For any given segment, the segment store instance hosting that segment handles the incoming traffic. Each segment maps to only one segment store instance at any given time. That segment store instance maintains metadata that describes the rate of traffic into the segment locally. The metadata includes the scaling-type, target-rate, and creation-time. In response to a segment being identified by a segment store instance as being either hot or cold, the hot/cold segment state is communicated to a central scaling coordinator component in the controller 24. The component consolidates the individual hot and cold states of multiple segments and calculates a centralized auto-scaling decision for a stream such as by replacing hot segments with multiple new segments and/or replacing multiple cold segments with a consolidated new segment.

The traffic rate of an individual segment is measured by computing an exponential weighted average of the amount of data (measured either in events or bytes) received per fixed interval of time ("tick"). The tick interval is a fixed-size small value, e.g., 5 seconds. An instantaneous rate is computed by dividing the incoming data in the last tick interval by the length of the interval. The running moving average for the traffic rate takes the latest incoming rate and performs an exponential weighted average computation with the existing running average. The exponentially weighted moving average formula is specifically the following:

Instant-rate=count of new values/tick-interval rate=rate*(1−weight)+instant-rate*weight The variable instant-rate refers to the rate of traffic received in the last tick, while the variable rate refers to the exponential weighted moving average rate that is computed.

Unlike a simple moving average where all past observations are weighted equally, exponential functions are used to assign exponentially decreasing weights over time. The weighted moving average gives higher weight to newer data points while the effect on averages from older data points decreases exponentially. Weight is a value between 0 and 1. The choice of the weight depends on relative importance of any recent data point with respect to older data. The higher the value of the weight, the more closely the exponential weighted moving average tracks the actual data time series. The following example illustrates a few relevant cases with a weight of 0.1. The rate is given in events per second and the tick interval is 1 second.

Steady traffic:
   Current rate=10
   Instant rate=11
   New rate=10*0.9+11*0.1=10.1

Spikey traffic:
  Current rate=10
  Instant rate=100
  New rate=10*0.9+100*0.1=19
Sudden dip:
  Current rate=10
  Instant rate=0
  New rate=10*0.9+0*0.1=9

The technique reduces the impact of sharp, short-lived changes on the estimated traffic for scaling.

The ingestion pattern into a segment may be either direct writes or transactional writes. Whenever a transaction is committed into a stream, all the data appended as part of the transaction is merged into the stream atomically. Transactional writes can induce significant bursts of arbitrarily large volumes of data. Transactional writes can also induce sparser traffic, so there may be no events being merged into the stream at some times and occasional bursts of events being included in the stream at another time. The weighted moving average scheme gives a fixed weight to more recent data. The rate computation scheme must react to both transactional write patterns and regular event write patterns into a stream. However, with transactions, the instant rates are spiked and can appear very high, which can lead to overestimated rates. For this reason, the impact of transactional writes on the instant rate computation is dampened by taking the transaction write spread over longer durations. The following is an example with transactional traffic, assuming a weight=0.1:

Rate is in events per second and tick interval is 1 second.
  Pattern: a transaction with 300 events is merged every 3 ticks.
  Using regular rate computation there is no traffic for the first two ticks, and there is a burst of traffic for the third tick.
  The rate is computed as follows:
    instant rate=300/1, new rate=10*0.9+300*0.1=39

At merge time it cannot be determined how the events of the transaction have been spread across its duration. To avoid the bias introduced by considering that all events arrive at the last tick, an assumption is made that it is evenly spread over the 3 ticks:

instant rate=300/3=100;
    Tick 1: instant rate=100, new rate=10*0.9+100*0.1=19
    Tick 2: instant rate=100, new rate=99*0.9+100*0.1=27.1
    Tick 3: instant rate=100, new rate=27.1*0.9+100*0.1=34.39

With this assumption, the contribution of transaction traffic to the rate calculation is smoother.

A single moving average yields one data point about the traffic pattern. Selecting a time window for the moving average to give higher weight to more recent traffic will bias the system towards reaction speed, whereas assigning more weight to older data will bias the system towards stability. A single rate is insufficient in identifying a trend—whether the traffic is seeing upward or downward swing. Consequently, relying on a single moving average alone would have limitations and would be biased towards either stability or reaction speed. To mitigate this tension between reaction speed and stability, multiple different running averages are computed for different time intervals, each with a different weight (decay) factor. Each average represents a different time window over which the weighted average is computed. Exemplary time windows may include, without limitation, 2 minutes, 5 minutes, 10 minutes, and 20 minutes. The selected weights for the time windows represent the window size and tick interval. For example, the 2-minute weight has higher value than the 20-minute weight, and it gives more weight to recent data in the case of the 2-minute average. The same observation holds when comparing the 2-minute rate to the 10-minute and 5-minute rates. Traffic trends can be identified by comparing the 2-minute, 5-minute and 10-minute rates. The absolute values indicate how quickly a reaction should be implemented. For example, if the 10-minute rate is lower than the 5-minute rate, which is lower than the 2-minute rate, then the traffic is showing an increasing trend. If the 2-minute rate suddenly spikes and crosses a threshold, then a quick reaction may be needed to handle the sudden increase in traffic. Similarly, if each of the 2-minute, 5-minute and 10-minute rates are stable, but they each cross the threshold, then a sustained high load is indicated, and the segment can be considered for scale-up. Adding more segments by scaling-up may be critical to accommodate higher workloads but reducing the number of segments by scaling-down is not critical from the perspective of overload, although it is desirable from the perspective of using resources efficiently. Consequently, a policy may handle hot segments more aggressively than cold segments. The threshold for a scale-down may be about half the target rate.

A heuristic may be employed to classify segments as shown in the following example:

1. Hot segment:
   Thresholds:
     2-minute threshold=5*target rate
     5-minute threshold=2*target rate
     10-minute threshold=target rate
   Condition: any-of
     2-min-rate>2-minute threshold
     5-min-rate>5-minute threshold
     10-minute rate>10-minute threshold
2. Cold segment:
   Thresholds:
     20-minute threshold=target rate/2
   Condition all-of:
     2-min-rate<target rate
     5-min-rate<target rate
     10-minute rate<target rate
     20-minute rate<20-minute threshold Because the rates are computed as weighted averages, the rates should be computed for a sustained period to get a good approximation of each of the real rates. For example, the rates are computed for only 2 minutes then each of the rates may be close to the instantaneous rate and not a true reflection of a sustained rate. Reacting only to instantaneous rate could lead to sub-optimal decisions on scaling and may lead to excessive or unnecessary scaling being performed. To increase the stability of scaling, the rates are allowed to stabilize by measuring them for a minimum period called "cool-down period." A segment is not considered for scaling immediately after its creation until at least the cool-down period elapses. Consequently, a segment is not scaled for at least the cool down period but can be scaled up or down any time after the cool down period elapses.

Once the local (per segment) decisions to scale-up or scale-down have been calculated, the decisions are consolidated, coordinated across segments, and executed. Those tasks are handled by the controller 24. Each segment store 26 posts the hot and cold segment signals into a dedicated stream used for the communication between controller and segment store. This mechanism allows decoupling of local computation on segment stores from the global consolidation that the controller performs. The segment stores can compute and post a "hot" or "cold" event for each segment individually, independent of other segments in the stream.

Figure 3:
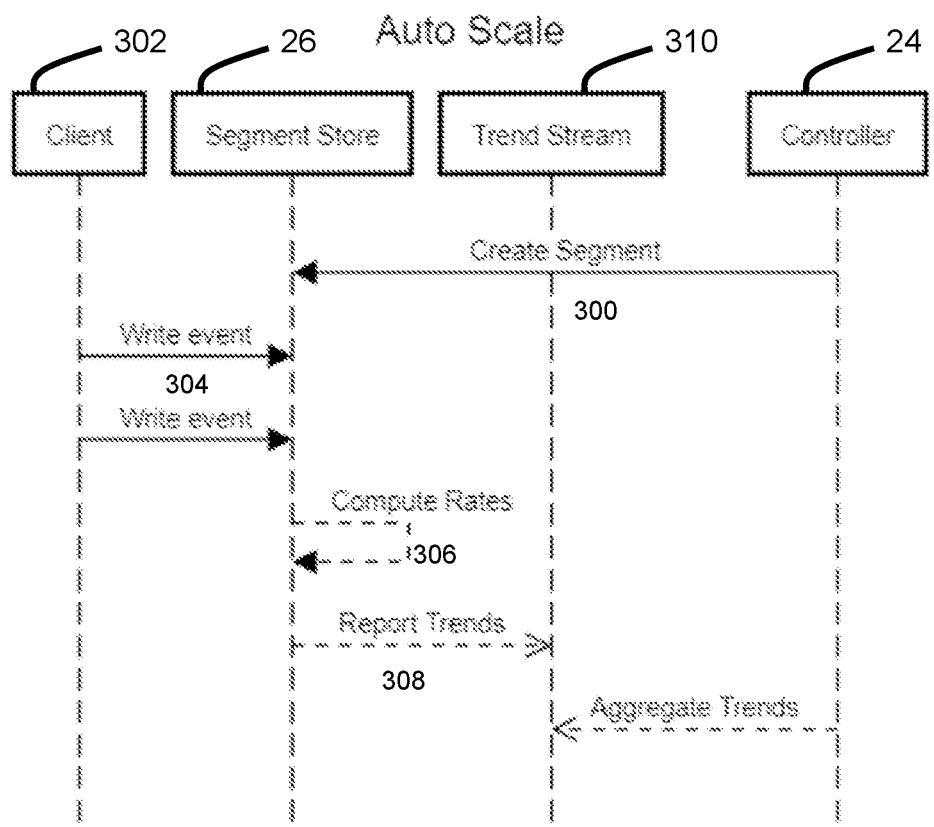
FIG. 3 illustrates central aggregation of locally identified segment traffic trends.

FIG. 3 illustrates central aggregation of locally identified traffic trends. The controller 24 sends a request to the segment store 26 to prompt creation of a segment as indicated at 300. The request includes a scaling policy. The segment store 26 durably stores the scaling policy with the segment metadata. Application writers (client 302) write events into a Pravega, and the events are routed to different stream segments as indicated at 304. The segment store 26 routes incoming traffic into segments and computes multiple exponential weighted averages with different decay factors as indicated at 306. These rates logically correspond to different time windows. Using the heuristic described above, the segment store identifies hot and cold segments. A segment is hot or cold only if it has received traffic for the duration of at least one "cooldown" period, which may be set to 10 minutes by default. If a segment is identified as either hot or cold, then a trend mark is reported as indicated at 308. This is accomplished by posting to a dedicated trend stream 310 where segment stores publish trends. The posted trend indicates the segment identify, whether the segment is hot or cold, and its load factor. The load factor potentially determines how many splits can be performed for this segment, e.g., load factor=current-rate/target-rate. Only one report is posted every two minutes for any segment, if it continues to exhibit a trend which is either hot or cold. If all traffic trends for a segment are within the desired threshold, then no trend is reported. The controller 24 monitors the trend stream and aggregates hot and cold trends of stream segments for use in calculation of scaling decisions. The scale-up and scale-down of stream segments is a logical operation where a subset of existing stream segments is replaced by a new set of segments that may be greater than or less than the number of segments being replaced. Each stream segment has a hash key space assigned to it statically upon creation. The events are routed to a segment if the hash value of its routing key falls within the assigned range for the segment. When the controller replaces stream segments with one or more new segments, it ensures that new segments cover the exact same key space range as the segments they are replacing. Scaling-up includes subdividing a key space range into smaller ranges and each subdivision is assigned to a new segment. Scaling-down includes combining the key space ranges of multiple segments in a wider range assigned to a new segment. The controller maintains a predecessor-successor relationship between the replacement segments and the replaced segments for a scale operation as part of the stream metadata.

Figure 4:
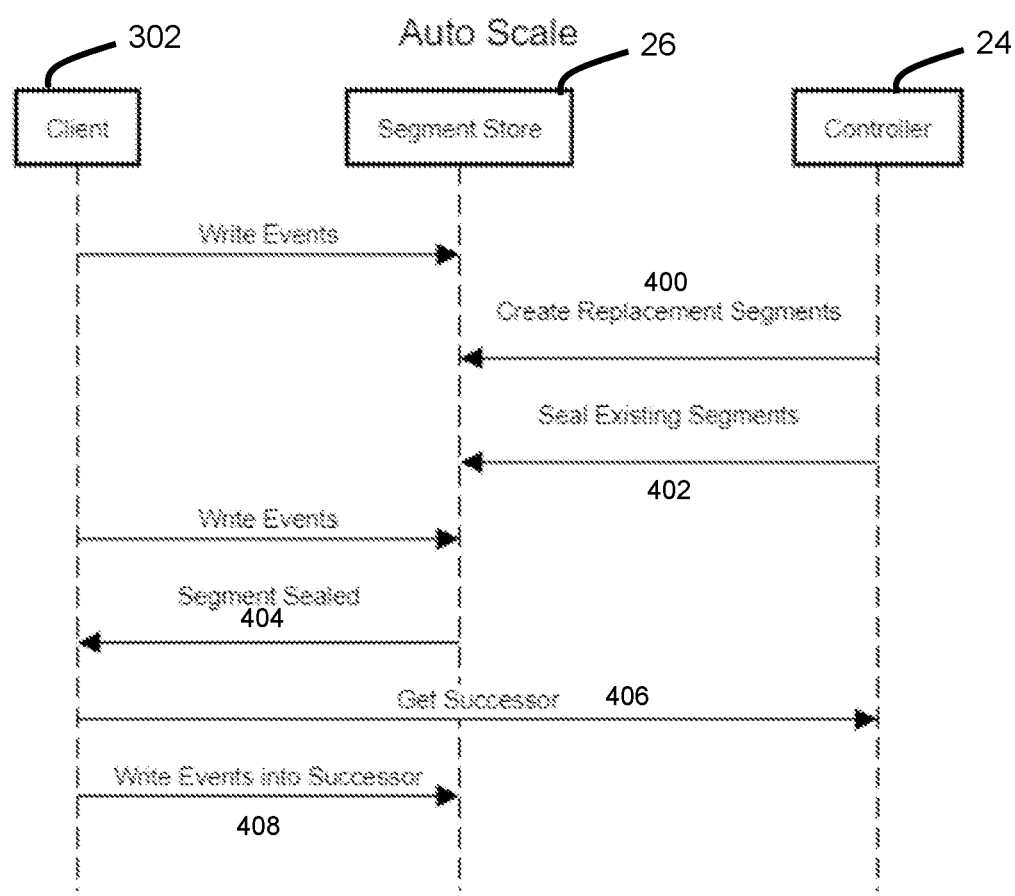
FIG. 4 illustrates global stream scaling computation.

FIG. 4 illustrates global stream scaling computation. For each stream, the controller 24 aggregates the hot and cold trend reports of segments in the stream. The controller makes global decisions about which segments to combine and which segments to split based on the aggregated trend reports. After identifying which segments to split and which segments to merge, the controller 24 orchestrates a workflow to ensure that the scaling execution is not disruptive, and the stream is available to be written to and read from. The controller first creates the replacement segments as indicated at 400, sets up predecessor-successor relationships, and seals off older segments for new write operations as indicated at 402. Sealing prevents any new writes to a segment. For any given routing key, until a segment is sealed off, writers can continue to append data to the segment by writing events. Only after the segment is sealed, as indicated at 404, will the client 302 query about successors as indicated at 406 and write data into the successor as indicated at 408

When an event is selected for processing, the segment name is obtained and the stream metadata on controller is updated to identify the segment as either hot or cold by adding a trend marker flag on stream segment. The scale workflow system is notified that the stream has some potential scaling activity to perform. The markers have an expiration time. If either the segment is not scaled or the marker expires, then it is assumed to have resumed normal traffic. The scale workflow system collates different trend markers on active segments in the stream. Segments identified as cold are merged with their immediate neighbors only if the neighbors are also marked as cold. Up to three immediate neighbors may be merged in one scale-down. Splits for a segment are determined by taking the minimum of ScalingPolicy.scaleFactor (a user defined bound on number of splits on a segment) and load factor. Scaling involves creating new segments, setting up successor relationships with existing segments, sealing existing segments that are to be replaced, and updating stream metadata with new set of active segments that constitute the stream.

Figure 5:
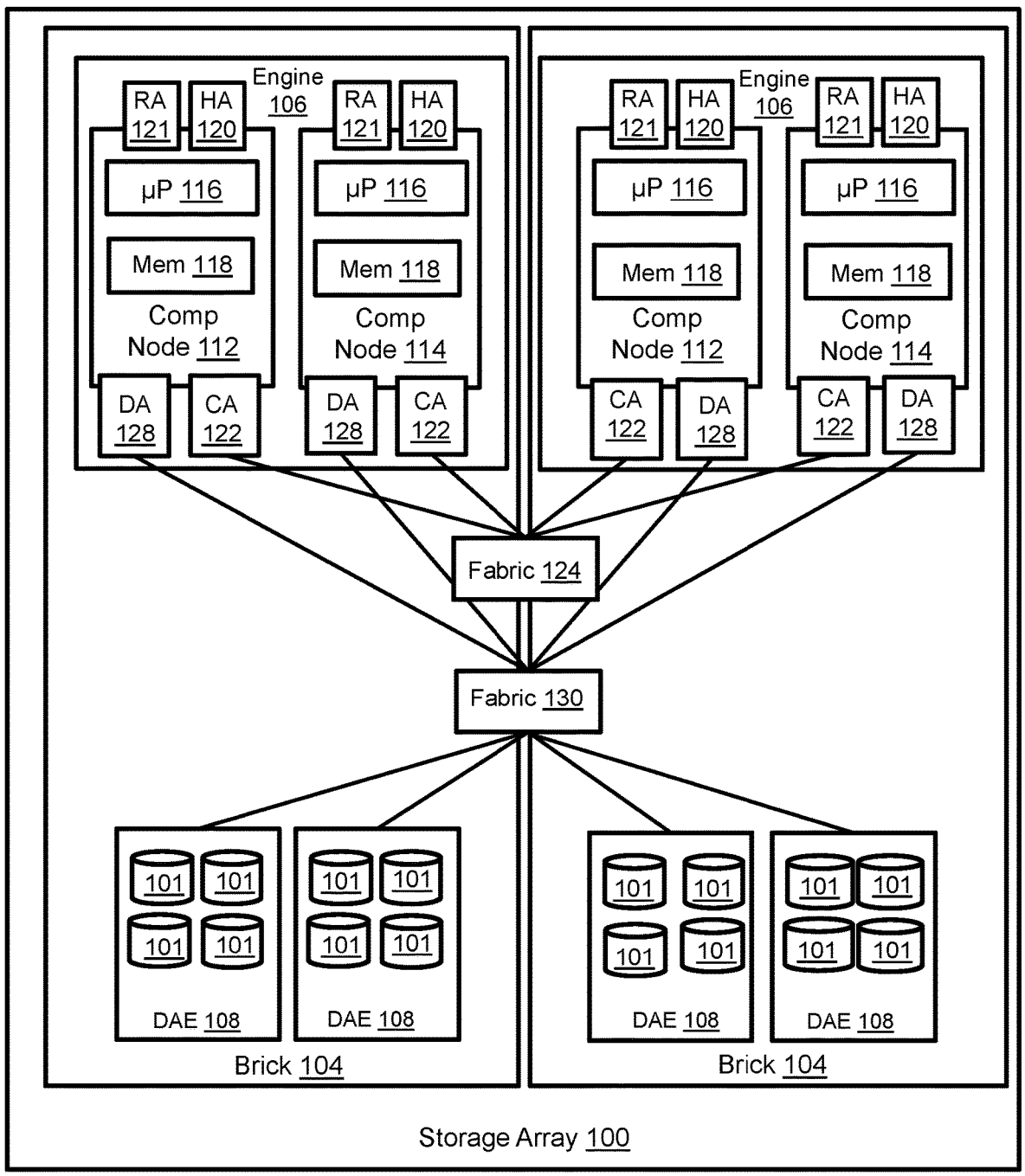
FIG. 5 illustrates an example of the storage system of FIG. 1.

FIG. 5 illustrates an example of the storage system of FIG. 1. In the illustrated example the storage system is a storage array 100. The storage array 100 includes one or more bricks 104. Each brick includes an engine 106 and one or more drive array enclosures (DAEs) 108. Each engine 106 includes a pair of interconnected compute nodes 112, 114 that are arranged in a failover relationship. The compute nodes may be referred to as "storage directors." Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the streaming data sources. Each host adapter has resources for servicing input-output commands (IOs) from intermediary servers. The HA resources may include processors, volatile memory, and ports via which the host servers may access the storage array. Each compute node also includes a remote adapter (RA) 121 for communicating with other storage systems. Each compute node also includes one or more drive adapters (DAs) 128 for communicating with managed drives 101 in the DAEs 108. Each DA has processors, volatile memory, and ports via which the compute node may access the DAEs for servicing IOs. Each compute node may also include one or more channel adapters (CAs) 122 for communicating with other compute nodes via an interconnecting fabric 124. Instances of the controller, segment store, and client run on the compute nodes. The stream is stored on the managed drives 101, which are non-volatile electronic data storage media such as, without limitation, NVME SSDs based on electrically erasable programmable read-only memory (EEPROM) technology such as NAND and NOR flash memory. Drive controllers may be associated with the managed drives as is known in the art. An interconnecting fabric 130 enables implementation of an N-way active-active back end. A back-end connection group includes all drive adapters that can access the same drive or drives. In some implementations every DA 128 in the storage array can reach every DAE via the fabric 130. Further, in some implementations every DA in the storage array can access every managed drive 101.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method implemented in a storage system with at least one non-volatile drive and at least one compute node configured to access the drive to store unbounded, continuously generated data in a stream, comprising:
routing incoming events to segments of the stream;
measuring event loading of each of the segments of the stream;
identifying event loading trends of each of the segments of the stream based on event loading changes; and
scaling-up a selected predecessor segment of the stream based on the event loading trends by creating a plurality of new successor segments such that a key space covered by the plurality of new successor segments collectively matches the key space covered by the selected predecessor segment and sealing the selected predecessor segment responsive to replacement of the predecessor segment by the plurality of new successor segments.

2. The method of claim 1 wherein identifying event loading trends of each of the segments of the stream based on event loading changes comprises identifying hot segments that are characterized by event loading that is greater than a first predetermined target event loading.

3. The method of claim 2 wherein scaling selected segments of the of the stream based on the event loading trends comprises splitting one of the hot segments into multiple new segments.

4. The method of claim 1 wherein identifying event loading trends of each of the segments of the stream based on event loading changes comprises identifying cold segments that are characterized by event loading that is less than a second predetermined target event loading.

5. The method of claim 4 wherein scaling selected segments of the of the stream based on the event loading trends comprises merging multiple cold segments into one new segment.

6. The method of claim 1 comprising measuring event loading of an individual segment by computing an exponential weighted moving average of data, measured either in events or bytes, received per fixed interval of time.

7. The method of claim 6 comprising using exponential functions to assign exponentially decreasing weights over time.

8. The method of claim 7 comprising computing multiple different running averages for different time intervals, each with a different weight that represents a decay factor.

9. A non-transitory computer-readable storage medium that stores instructions that when executed by a storage system causes the storage system to perform a method for storing unbounded, continuously generated data in a stream, the method comprising:
routing incoming events to segments of the stream;
measuring event loading of each of the segments of the stream;
identifying event loading trends of each of the segments of the stream based on event loading changes; and
scaling-up a selected predecessor segment of the stream based on the event loading trends by creating a plurality of new successor segments such that a key space covered by the plurality of new successor segments collectively matches the key space covered by the selected predecessor segment and sealing the selected predecessor segment responsive to replacement of the predecessor segment by the plurality of new successor segments.

10. The non-transitory computer-readable storage medium of claim 9 wherein identifying event loading trends of each of the segments of the stream based on event loading changes comprises identifying hot segments that are characterized by event loading that is greater than a first predetermined target event loading.

11. The non-transitory computer-readable storage medium of claim 10 wherein scaling selected segments of the of the stream based on the event loading trends comprises splitting one of the hot segments into multiple new segments.

12. The non-transitory computer-readable storage medium of claim 9 wherein identifying event loading trends of each of the segments of the stream based on event loading changes comprises identifying cold segments that are characterized by event loading that is less than a second predetermined target event loading.

13. The non-transitory computer-readable storage medium of claim 12 wherein scaling selected segments of the of the stream based on the event loading trends comprises merging multiple cold segments into one new segment.

14. The non-transitory computer-readable storage medium of claim 9 wherein the method comprises measuring event loading of an individual segment by computing an exponential weighted moving average of data, measured either in events or bytes, received per fixed interval of time.

15. The non-transitory computer-readable storage medium of claim 14 wherein the method comprises using exponential functions to assign exponentially decreasing weights over time.

16. The non-transitory computer-readable storage medium of claim 15 wherein the method comprises computing multiple different running averages for different time intervals, each with a different weight that represents a decay factor.

17. An apparatus comprising:
at least one non-volatile drive on which a stream is stored; and
at least one compute node comprising a controller and instances of a segment store, wherein the segment store instances are configured to route incoming events to segments of the stream, measure event loading of each of the segments of the stream and identify and report loading trends of each of the segments of the stream based on event loading changes, and the controller is configured to scale-up a selected predecessor segment of the stream based on the event loading trends by creating a plurality of new successor segments such that a key space covered by the plurality of new successor segments collectively matches the key space covered by the selected predecessor segment and sealing the selected predecessor segment responsive to replacement of the predecessor segment by the plurality of new successor segments.

18. The apparatus of claim 17 wherein the segment store instances are configured to measure event loading of each individual segment by computing an exponential weighted moving average of data, measured either in events or bytes, received per fixed interval of time.

19. The apparatus of claim 18 wherein the segment store instances are configured to use exponential functions to assign exponentially decreasing weights over time.

20. The apparatus of claim 19 wherein the segment store instances are configured to compute multiple different running averages for different time intervals, each with a different weight that represents a decay factor.

* * * * *